United States Patent
Hay et al.

(10) Patent No.: US 11,016,874 B2
(45) Date of Patent: May 25, 2021

(54) UPDATING TAINT TAGS BASED ON RUNTIME BEHAVIOR PROFILES

(71) Applicant: International Business Machines Corporation, Armonk, NY (US)

(72) Inventors: Roee Hay, Singapore (SG); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/136,017

(22) Filed: Sep. 19, 2018

(65) Prior Publication Data

US 2020/0089595 A1  Mar. 19, 2020

(51) Int. Cl.
  *G06F 9/44* (2018.01)
  *G06F 9/445* (2018.01)
  *G06F 11/36* (2006.01)
  *G06F 21/56* (2013.01)

(52) U.S. Cl.
  CPC ...... *G06F 11/3612* (2013.01); *G06F 9/44505* (2013.01); *G06F 11/3692* (2013.01); *G06F 21/566* (2013.01)

(58) Field of Classification Search
  CPC ............. G06F 11/3612; G06F 9/44505; G06F 11/3692; G06F 21/566
  See application file for complete search history.

(56) References Cited

U.S. PATENT DOCUMENTS

| | | | |
|---|---|---|---|
| 8,381,192 B1* | 2/2013 | Drewry | G06F 11/3624 712/233 |
| 8,646,088 B2 | 2/2014 | Pistoia et al. | |
| 8,893,280 B2 | 11/2014 | Jung et al. | |
| 9,684,788 B2* | 6/2017 | Ferrara | H04L 63/20 |
| 9,942,243 B2* | 4/2018 | Beardsmore | H04L 51/12 |
| 10,049,222 B1* | 8/2018 | Allen | G06F 21/62 |
| 2011/0264476 A1* | 10/2011 | Work | G06Q 40/06 705/7.11 |
| 2011/0314337 A1* | 12/2011 | Sinha | G06F 11/3624 714/37 |
| 2013/0081134 A1* | 3/2013 | Glew | G06F 21/552 726/22 |
| 2013/0086676 A1* | 4/2013 | Chess | G06F 21/554 726/22 |
| 2013/0086687 A1* | 4/2013 | Chess | G06F 21/53 726/25 |

(Continued)

OTHER PUBLICATIONS

Zhen Xu, A dynamic taint forensic analysis tool for Android apps, 2017, pp. 1-70. https://pdfs.semanticscholar.org/063f/f3a02d7d090826491341b2c4eaf5fb4e5d95.pdf (Year: 2017).*

(Continued)

*Primary Examiner* — Mongbao Nguyen

(57) ABSTRACT

An example system includes a processor to receive an application to be instrumented. The processor is to also instrument the application based on a baseline taint tracking scheme to generate an instrumented application including taint tags. The processor is also to execute the instrumented application and generate a profile of runtime behavior of the application. The processor is to modify the baseline tracking scheme based on the profile to generate an updated taint tracking scheme.

9 Claims, 6 Drawing Sheets

(56) References Cited

U.S. PATENT DOCUMENTS

| | | | |
|---|---|---|---|
| 2014/0317747 A1* | 10/2014 | Tripp | G06F 11/3644 726/25 |
| 2014/0317748 A1* | 10/2014 | Guarnieri | G06F 11/3644 726/25 |
| 2015/0022774 A1 | 1/2015 | Chen | |
| 2015/0037304 A1 | 2/2015 | Gregory et al. | |
| 2015/0082439 A1 | 3/2015 | Molnar et al. | |
| 2015/0121533 A1* | 4/2015 | Gluck | G06F 11/3476 726/25 |
| 2015/0128262 A1* | 5/2015 | Glew | G06F 21/554 726/23 |
| 2015/0161393 A1* | 6/2015 | Pistoia | G06F 21/577 726/25 |
| 2015/0227746 A1* | 8/2015 | Chen | G06F 21/577 726/25 |
| 2015/0271196 A1* | 9/2015 | Hay | H04L 63/1433 726/25 |
| 2016/0088007 A1* | 3/2016 | Kawakoya | G06F 21/52 726/23 |
| 2016/0127396 A1* | 5/2016 | Iwamura | G06F 21/566 726/22 |
| 2016/0217029 A1* | 7/2016 | Yoon | G06F 9/54 |
| 2016/0378987 A1* | 12/2016 | Ferrara | G06F 21/566 726/1 |
| 2017/0206355 A1* | 7/2017 | Nagumo | G06F 21/62 |
| 2017/0206356 A1* | 7/2017 | Iwamura | G06F 21/56 |
| 2018/0060572 A1* | 3/2018 | Singleton | G06F 21/552 |
| 2018/0091541 A1* | 3/2018 | Ferrara | H04L 63/1433 |
| 2018/0285186 A1* | 10/2018 | Godefroid | G06F 11/0751 |
| 2019/0102563 A1* | 4/2019 | Cherupalli | G06F 21/71 |
| 2019/0108332 A1* | 4/2019 | Glew | G06F 21/552 |
| 2019/0205532 A1* | 7/2019 | Loch | G06F 21/552 |
| 2019/0213322 A1* | 7/2019 | Dehon | G06F 21/52 |
| 2020/0019728 A1* | 1/2020 | Rolle | G06F 11/3086 |

OTHER PUBLICATIONS

William Enck, TaintDroid: An Information-flow tracking system for realtime privacy monitoring on smartphones, 2014, p. 1-15. https://www.microsoft.com/en-US/research/publication/taintdroid-an-information-flow-tracking-system-for-realtime-privacy-monitoring-on-smartphones/ (Year: 2014).*

Boxuan Gu, D2Taint: Differentiated and Dynamic Information Flow Tracking on Smartphones for Numerous Data, 2013, pp. 791-799. https://ieeexplore.ieee.org/stamp/stamp.jsp?tp=&arnumber=6566866 (Year: 2013).*

Weiming Li, A Dynamic Taint Tracking Based Method to Detect Sensitive Information Leaking, 2014, pp. 1-4. https://ieeexplore.ieee.org/stamp/stamp.jsp?tp=&arnumber=6996578 (Year: 2014).*

William Enck, TaintDroid: An Information-Flow Tracking System for Realtime Privacy Monitoring on Smartphones, 2014, pp. 1-29. https://dl.acm.org/doi/pdf/10.1145/2619091 (Year: 2014).*

Tejas Saoji, Implementing Dynamic Coarse & Fine Grained Taint Analysis for Rhino JavaScript, 2017, pp. 1-47. https://scholarworks.sjsu.edu/cgi/viewcontent.cgi?article=1519&context=etd_projects (Year: 2017).*

Chang, Walter, et al.; "Efficient and Extensible Security Enforcement Using Dynamic Data Flow Analysis"; CCS'08; Oct. 27-31, 2008; 12 pages. https://www.cs.utexas.edu/~lin/papers/ccs08.pdf.

Guarnieri, Salvatore, et al., Saving the World Wide Web from Vulnerable JavaScript, in ISSTA, 2011, Jul. 17-21, 2011, Toronto, ON, Canada, pp. 177-187.

Tripp, Omer, et al., Andromeda: Accurate and Scalable Security Analysis of Web Applications, 16th International Conference, FASE 2013, Held as Part of the European Joint Conferences on Theory and Practice of Software, ETAPS 2013, Proceedings (vol. 7793 LNCS, pp. 210-225), pp. 1-16.

Tripp, Omer, et al., TAJ: Effective Taint Analysis of Web Applications, in PLDI, 2009, pp. 87-97.

Arzt, Steven, et al., FlowDroid: Precise Context, Flow, Field, Object-sensitive and Lifecycle-aware Taint Analysis for Android Apps, PLDI '14, Jun. 9-11 2014, Edinburgh, United Kingdom, pp. 1-11.

Enck, William, et al., TaintDroid: An Information-Flow Tracking System for Realtime Privacy Monitoring on Smartphones, in OSDI, 2010, pp. 1-15.

Tripp, Omer, et al., A Bayesian Approach to Privacy Enforcement in Smartphones, in USENIX Security, 2014, pp. 175-190.

* cited by examiner

200

US 11,016,874 B2

UPDATING TAINT TAGS BASED ON RUNTIME BEHAVIOR PROFILES

BACKGROUND

The present techniques relate to taint analysis. More specifically, the techniques relate to updating taint tags based on runtime behavior profiles.

SUMMARY

According to an embodiment described herein, a system can include a processor to receive an application to be instrumented. The processor can also further instrument the application based on a baseline taint tracking scheme to generate an instrumented application comprising taint tags. The processor can also execute the instrumented application and generate a profile of runtime behavior of the application. The processor can also further modify the baseline tracking scheme based on the profile to generate an updated taint tracking scheme.

According to another embodiment described herein, a method can include receiving, via a processor, an application to be instrumented. The method can also further include instrumenting, via the processor, the application based on a baseline taint tracking scheme to generate an instrumented application comprising taint tags. The method can also include executing, via the processor, the instrumented application and generate a profile of runtime behavior of the application. The method also can further include modifying, via the processor, the baseline tracking scheme based on the profile to generate an updated taint tracking scheme.

According to another embodiment described herein, a computer program product for updating taint tags based on runtime behavior profiles can include computer-readable storage medium having program code embodied therewith. The computer readable storage medium is not a transitory signal per se. The program code is executable by a processor to cause the processor to receive an application to be instrumented. The program code can also cause the processor to instrument the application based on a baseline taint tracking scheme to generate an instrumented application comprising taint tags. The program code can also cause the processor to execute the instrumented application and generate a profile of runtime behavior of the application. The program code can also cause the processor to modify the baseline tracking scheme based on the profile to generate an updated taint tracking scheme. The program code can also cause the processor to also further instrument the application using the updated taint tracking scheme to generate an updated instrumented application. The program code can also cause the processor to also execute the updated instrument application.

DETAILED DESCRIPTION

Figure 1:
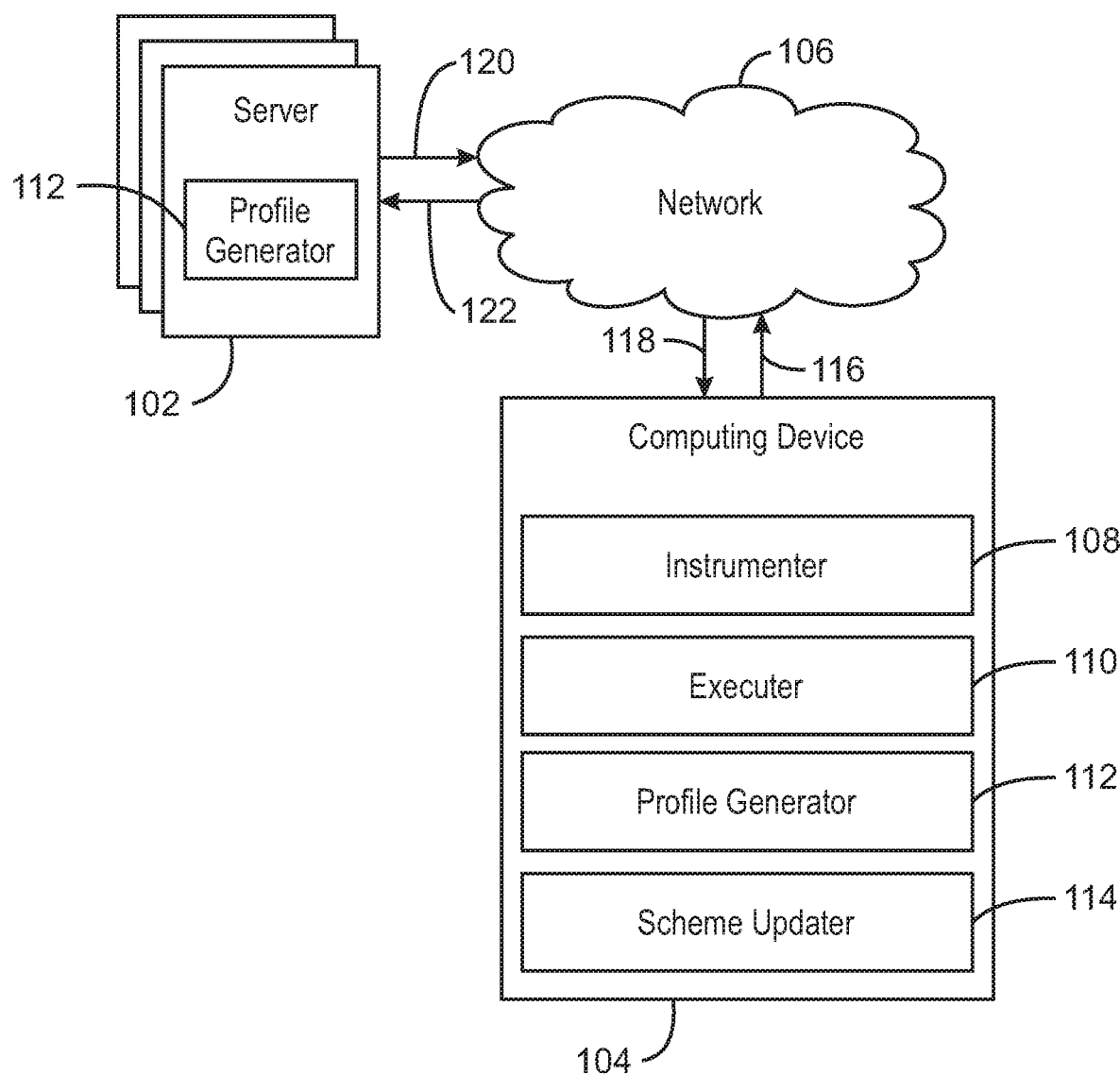
FIG. 1 is a block diagram of an example system that can update taint tags based on runtime behavior profiles.

Taint analysis may be used for checking integrity and confidentiality properties of software. In particular, taint analysis may be used to specifically track information flows extending between designated sources, which read the location, and sinks, which release data to external observers, by propagating taint tags across statements. Taint analysis may thus generally provide an effective balance between performance and completeness. In some examples, taint analysis can include taint-based static privacy verification of applications, as well as low-overhead real-time privacy enforcement by detecting dynamically, via online taint tracking, attempts to release sensitive data.

In some examples, information-flow tracking in general, and taint analysis in particular, may be used with mobile technologies. While mobile applications offer increasingly richer and more contextual functionality, the increased functionality may sometimes be enabled at the expense of privacy. The provided features and services may be derived from various mobile-specific sources, such as the user's current and past locations; a persistent identity, established via the device and Subscriber Identity Module (SIM) identifiers; digital media, such as microphone and camera data; contacts; and social networks. Access to these sources of information enables advanced functionality, but at the same time raises privacy threats that can be addressed by tracking where and how private information flows. However, a high overhead incurred by the maintenance and propagation of taint tags may make runtime enforcement of security and privacy properties in general, and via taint tracking in specific, resource intensive. Such maintenance and propagation of taint tags may take place frequently and for very many objects in industry-scale applications. For example, such applications may often include special security and privacy features.

According to embodiments of the present techniques a processor may receive an application to be instrumented. For example, the application may be a mobile app. The processor may instrument the application based on a baseline taint tracking scheme to generate an instrumented application including taint tags. For example, the processor may insert taint tags into the application based on the baseline taint tracking scheme. The processor may also execute the instrumented application and generate a profile of runtime behavior of the application. The processor may further modify the baseline tracking scheme based on the profile to generate an updated taint tracking scheme. The processor may then instrument the application using the updated taint tracking scheme to generate an updated instrumented application and execute the updated instrument application. The present techniques are thus able to detect, at runtime, which data structures are not involved in taint propagation, and optimize the overhead of runtime security enforcement by swapping to a more efficient tracking scheme with respect to the granularity of taint tags. For example, if, at a later point in time, it is discovered that the data structure is reached by taint flow, and thus referred to herein as tainted, then scheme swapping is possible to refine the granularity of taint tags. Thus, the present techniques enable dynamic taint tracking with varying degrees of granularity. The present techniques thus provide increased efficiency in dynamic taint tracking, while maintaining performance.

In some scenarios, the techniques described herein may be implemented in a cloud computing environment. As discussed in more detail below in reference to at least FIGS. 3, 4, and 5, a computing device configured to update taint tags based on runtime behavior profiles may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is a block diagram of an example system that can update taint tags based on runtime behavior profiles. The system is generally referred to using the reference number 100 and can be implemented at least in part using the computing device 300 of FIG. 3 below.

The example system 100 includes one or more servers 102, a computing device 104, and a network 106. For example, the computing device 104 may be a mobile device, such as a smartphone, tablet, or laptop. In some examples, the one or more servers 102 may be remote servers that are interconnected to provide a service such as a cloud based service. In some examples, the network 106 may be a local area network or the Internet, among other possible networks. The computing device 104 includes an instrumenter 108, an executer 110, a profile generator 112, and a scheme updater 114. The one or more servers 102 may also include a profile generator. In some examples, the system 100 may not include the one or more servers 102. The computing device 106 is shown sending and receiving data to and from the network 106, as indicated by arrows 116, 118, respectively. The one or more servers 102 are also shown sending and receiving data to and from the network 106, as indicated by arrows 120, 122, respectively.

In the example system 100, the computing device 104 may include one or more applications to be executed. For example, the applications may be mobile apps. The instrumenter 108 can instrument the applications with a number of taint tags based on a baseline taint tracking scheme. For example, the baseline taint tracking scheme may have a grain of one taint tag per every concrete object. As used herein, grain or granularity refer to the data structure level at which taint tags are used. For example, a coarser grain may refer to taint tags being used at a higher level of abstraction, while a finer grain may refer to taint tags being used at lower levels of abstraction. Thus, the baseline taint tracking scheme may be preset to a coarser grain by default. In some examples, intermediate levels of granularity may be used. For example, rather than defining taint tags to range over the entire data structure of individual entries, the taint tags may range over all entries sharing some common hash value.

In some examples, once the application is instrumented based on the baseline taint tracking scheme, the application can then be executed by the executer 110. In some examples, the application may be executed in a deployment mode. As used herein, a deployment mode refers to running the application in its real environment. In some examples, the application can be executed multiple times. The profile generator 112 can then generate a profile of the runtime behavior of the application, also referred to herein as the runtime behavior profile. In some examples, the profile generator 112 can determine whether or not dominant data structures are reached by taint after a certain duration or across different executions of the application. In some examples, the profile generator 112 may use probability distribution ranges over inputs. For example, rather than using an absolute, or qualitative, determination that a taint does not reach a given data structure, the profile generator 112 may instead determine whether a taint rarely reaches a data structure, where the probability distribution ranges over inputs. Thus, data structures with a probability below a threshold probability may not be tagged with a taint tag, while data structures having a probability higher than the threshold probability may have a taint tag inserted during instrumentation.

In some examples, the scheme updater 114 may update the taint tracking scheme based on the generated profile. For example, for data structures found not to be reached by taint to which a fine-grained scheme is applied, the scheme updater 114 can update the taint tracking scheme such that a single taint tag is associated with the entire data structure. In some examples, for data structures found to be reached by taint to which a coarse-grained scheme is applied, the scheme updater 114 can update the taint tracking scheme such that per-entry tags are associated with the entries in the data structure. In some examples, once the taint tracking scheme is updated, the instrumenter 108 can instrument the application using the updated taint tracking scheme. The executer 110 may once again execute the application after it has been instrumented based on the updated taint tracking scheme.

As one example, an application including a Map data structure may be instrumented using an initial default tag grain of one tag per every concrete object. A Map instance may consist of a large number of key/value entries. Each of those pairs may thus initially be assigned a taint tag, and each operation involving these objects would have to be instrumented to propagate taint tags (if any). In practice, however, the Map instance may not be involved in any taint flow. Thus, executing the application in this with such granularity may be suboptimal, since the instance may never be reached by any taint flow. After some period off execu- tion, or after a predetermined number of executions, the system may thus detect that a Map instance will never be tainted, at which point the system may modify the tracking scheme such that all key/value entries under the Map instances are governed by a single taint tag. Thus, future executions of the application may be more efficiently executed and analyzed for further security issues.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional computing devices, servers, networks, modules, etc.).

Figure 2:
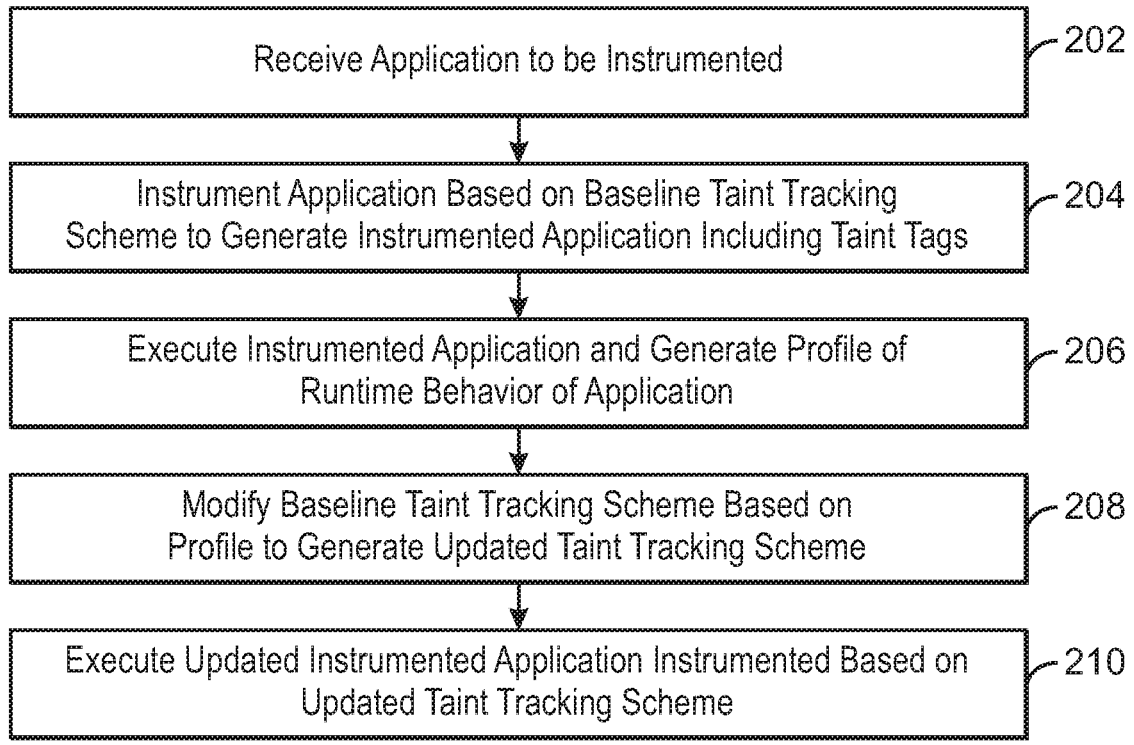
FIG. 2 is a process flow diagram of an example method for updating taint tags based on runtime behavior profiles.

FIG. 2 is a process flow diagram of an example method for updating taint tags based on runtime behavior profiles. The method 200 can be implemented with any suitable computing device, such as the computing device 300 of FIG. 3. For example, the method can be implemented via the processor 302 of computing device 300.

At block 202, a processor receives an application to be executed. For example, the application may be a mobile application, a server application, or an application that can be executed with any suitable computing device. In some examples, the application may include data structures that include large numbers of key/value entries. In some examples, each of the runtime objects can be assigned a taint tag. As used herein, a runtime object is an instance of a data structure. In some examples, each operation involving the runtime objects can be instrumented to propagate taint tags, if any.

At block 204, the processor instruments an application with a baseline taint tracking scheme to generate an instrumented application including taint tags. For example, a baseline taint tracking scheme may include all map values. In other words, the baseline tracking scheme may include all instances included within a map. In some examples, the baseline taint tracking scheme may be preconfigured or reconfigurable. In some examples, a number of taint tags may be inserted into the application based on the baseline taint tracking scheme. For example, a taint tag may be a Boolean value that can flag whether a given instance is tainted.

At block 206, the processor executes the instrumented application and generates a profile of runtime behavior of the application. For example, the profile may include the number of instance accesses with tainted data. In some examples, a profile may indicate that a Map has been accessed with the key "foo" with tainted data X times. For example, the Map may be a hash table. In some examples, the processor may execute the instrumented application in a deployment mode. In some examples, the application may execute the application for a predetermined amount of time. In some examples, the application may execute the application for a predetermined amount of executions. In some examples, the generated profile may include a number of data structures and associated taint attributes. In some examples, the taint attributes may indicate whether a particular data structure is tainted or not tainted. For example, a data structure that is reached by tainted flow or has a probability higher than a threshold probability of being reached by a taint flow, may be detected as tainted. In some examples, the taint attributes may indicate a probability of an associated data structure being tainted.

At block 208, the processor modifies taint tags of the baseline taint tracking scheme based on the profile to generate an updated taint tracking scheme. For example, the processor may associate a single taint tag with a data structure in response to detecting that components of the data structure tagged according to the baseline tracking scheme are not tainted. In some examples, the processor may associate per-entry taint tags with entries in a data structure in response to detecting that the data structure tagged with a single taint tag according to the baseline tracking scheme is tainted. For example, per-entry taint tags may be associated with individual entries of a data structure. In some examples, the processor can assign taint tags based on a threshold probability of data structures being reached by taint. For example, a tainted object may be inserted into the key 'foo' of a map instance with probability X and a threshold probability may be preconfigured as the value Y. In some examples, if X>Y, then a finer grain policy can be applied on that map. In some examples, if X<Y, then a coarser grain policy can be applied on the map. In some examples, the processor can assign taint tags to entries in a data structure that share a common hash value. In some examples, the processor can then instrument the application based on the set of taint tags included in the updated taint tracking scheme. For example, the processor may update the taint tracking scheme by including or removing various types of taint tags based on the generated profile.

At block 210, the processor executes the instrumented application with the updated taint tracking scheme. For example, the processor may have instrumented the original application based on the updated taint tracking scheme to generate an updated instrumented application and execute the updated instrumented application.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
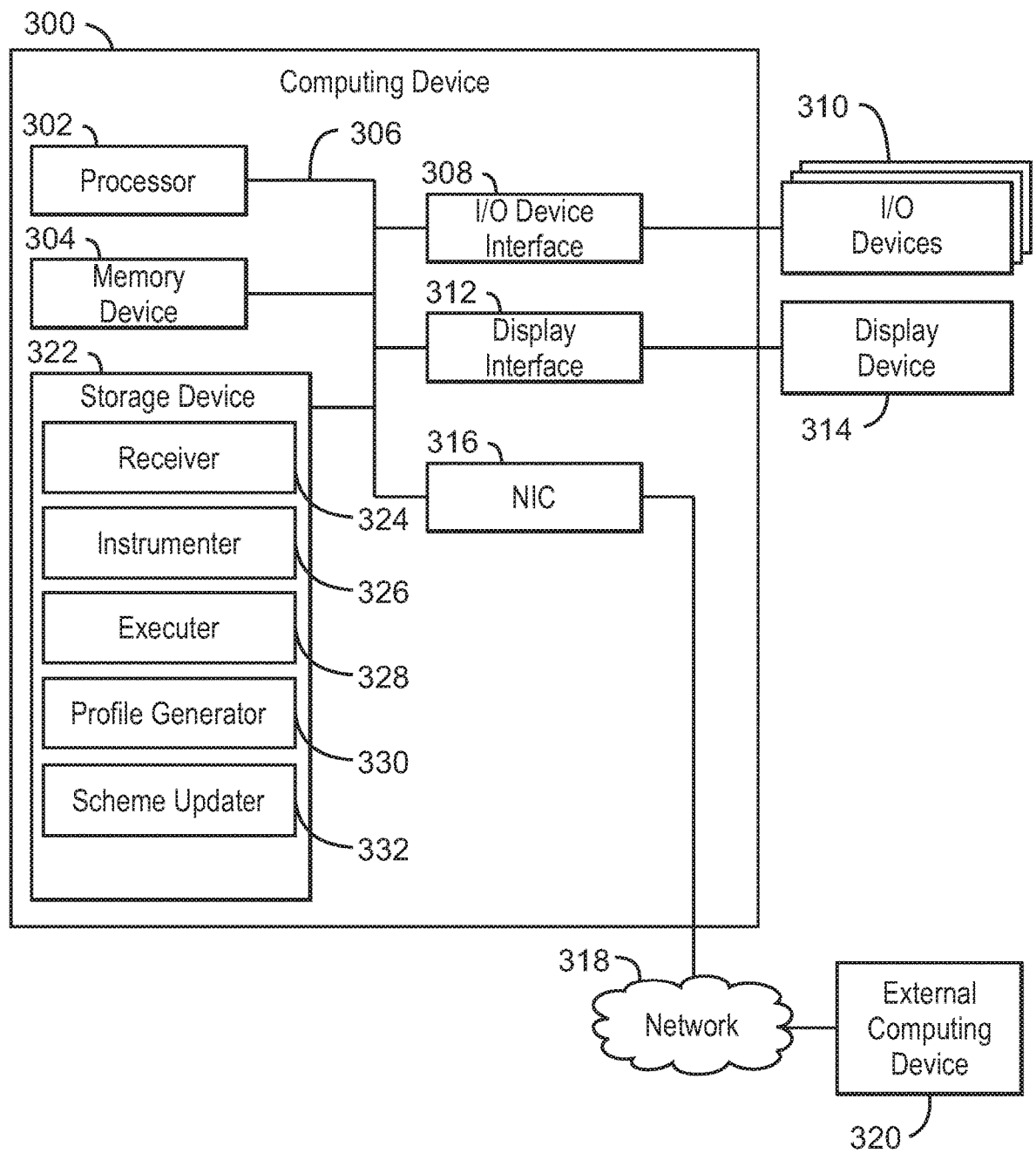
FIG. 3 is a block diagram of an example computing device that can update taint tags based on runtime behavior profiles.

With reference now to FIG. 3, an example computing device can update taint tags based on runtime behavior profiles. The computing device 300 may be for example, a server, a network device, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external webserver 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a receiver 324, an instrumenter 326, an executer 328, a profile generator 330, and a scheme updater 332. The receiver 324 can receive an application to be instrumented. For example, the application may be a mobile app. The instrumenter 326 can then instrument the application based on a baseline taint tracking scheme to generate an instrumented application including taint tags. For example, the baseline tracking scheme can include a preconfigured default taint tag granularity. In some examples, the instrumented application can include a plurality of taint tags to track taint propagation. The executer 328 can execute the instrumented application. The profile generator 330 can generate a profile of runtime behavior of the application. For example, the profile generator 330 can detect that a data structure is tainted after a predetermined duration or across a predetermined number of executions of the application. The scheme updater 332 can modify the baseline tracking scheme based on the profile to generate an updated taint tracking scheme. For example, the updated taint tracking scheme may include taint tags based on probability distributions. In some examples, the updated taint tracking scheme may have a granularity based on common hash values. In some examples, the instrumenter 326 can then instrument the application using the updated taint tracking scheme to generate an updated instrumented application and execute the updated instrument application.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the receiver 324, the instrumenter 326, the executer 328, the profile generator 330, the scheme updater 332, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the receiver 324, the instrumenter 326, the executer 328, the profile generator 330, the scheme updater 332, can be implemented with logic, wherein the logic, as referred to herein, can include any suitable hardware (e.g., a processor, among others), software (e.g., an application, among others), firmware, or any suitable combination of hardware, software, and firmware.

Figure 4:
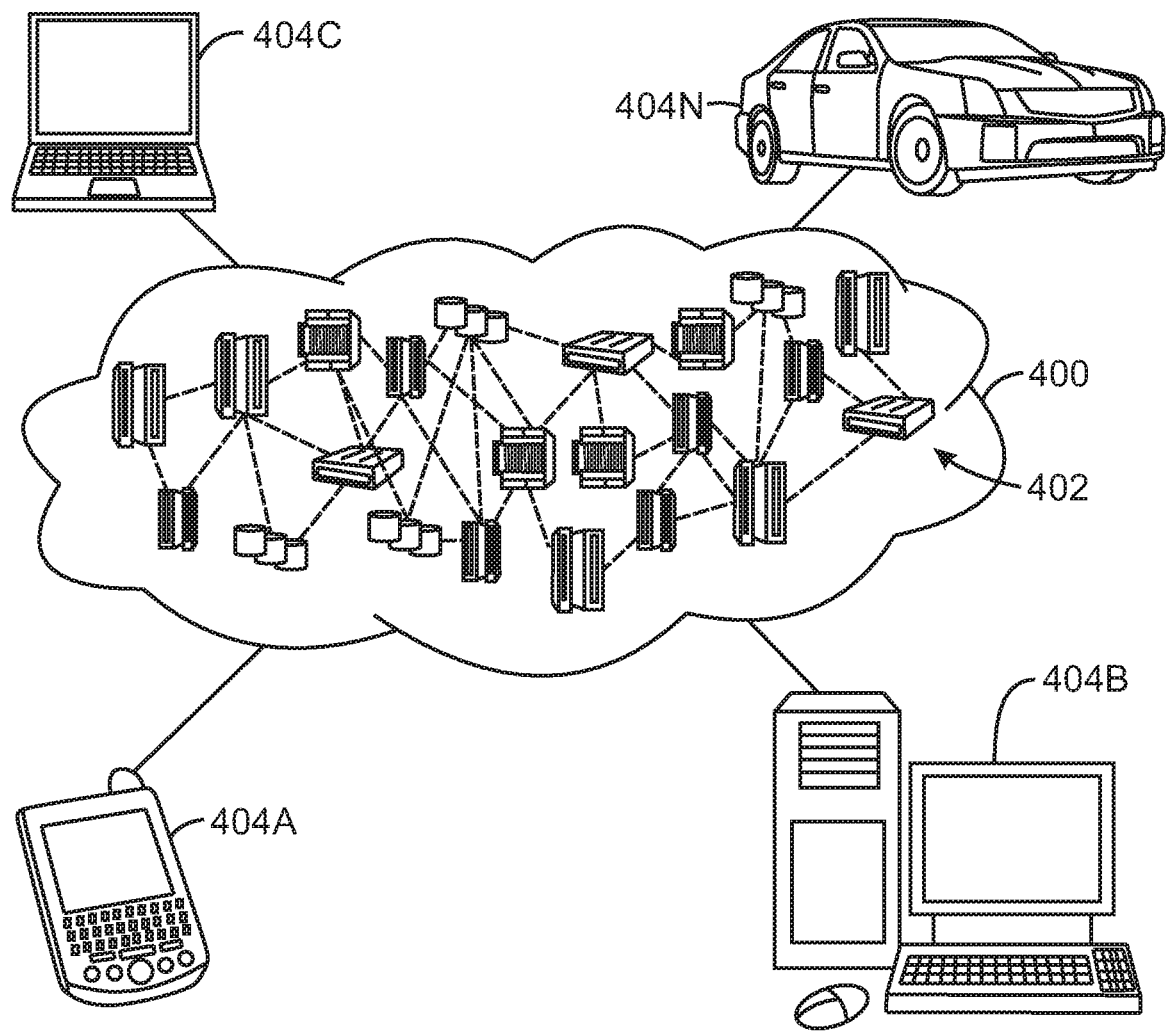
FIG. 4 is a block diagram of an example cloud computing environment according to embodiments described herein.

Referring now to FIG. 4, an illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
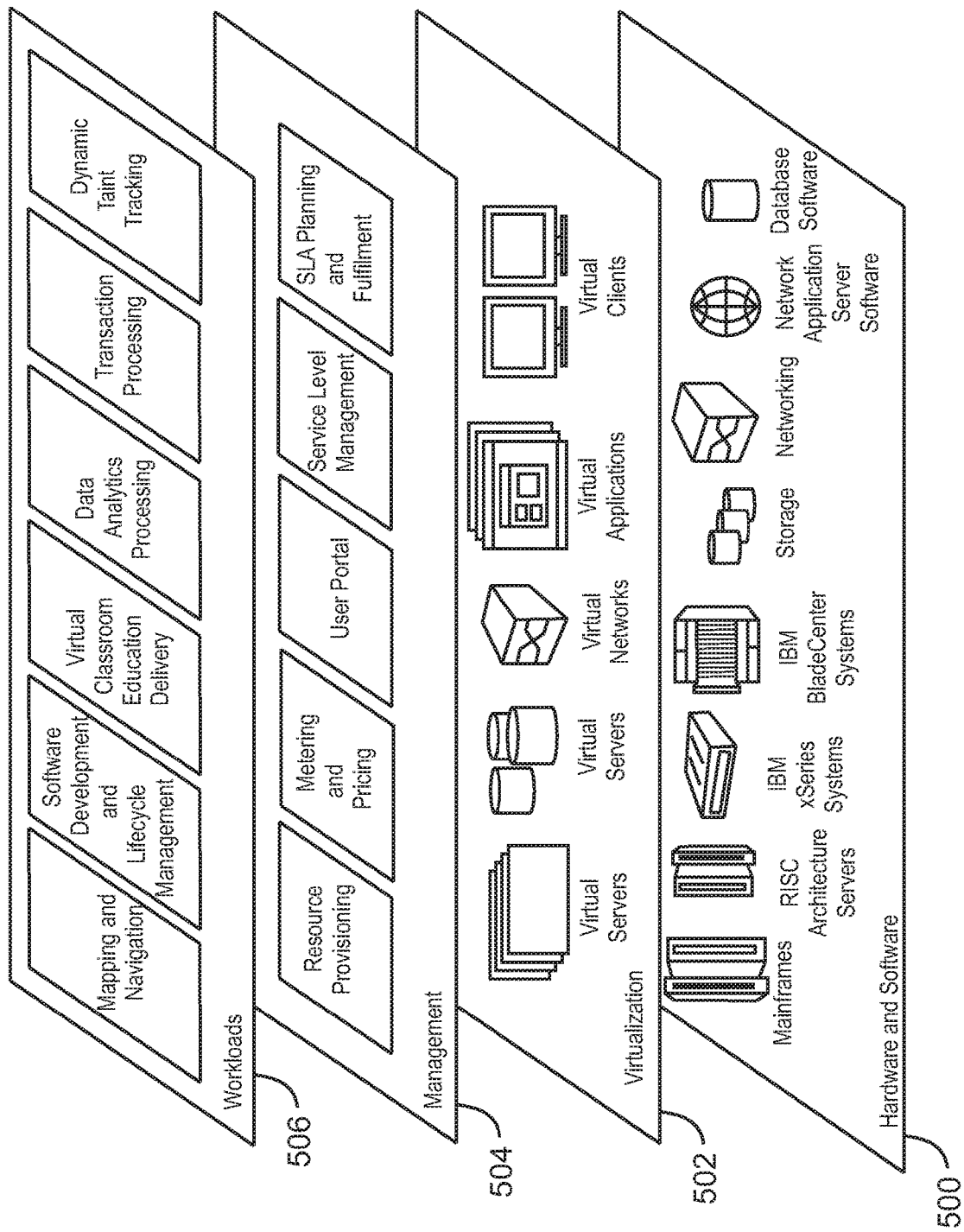
FIG. 5 is an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and dynamic taint tracking.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
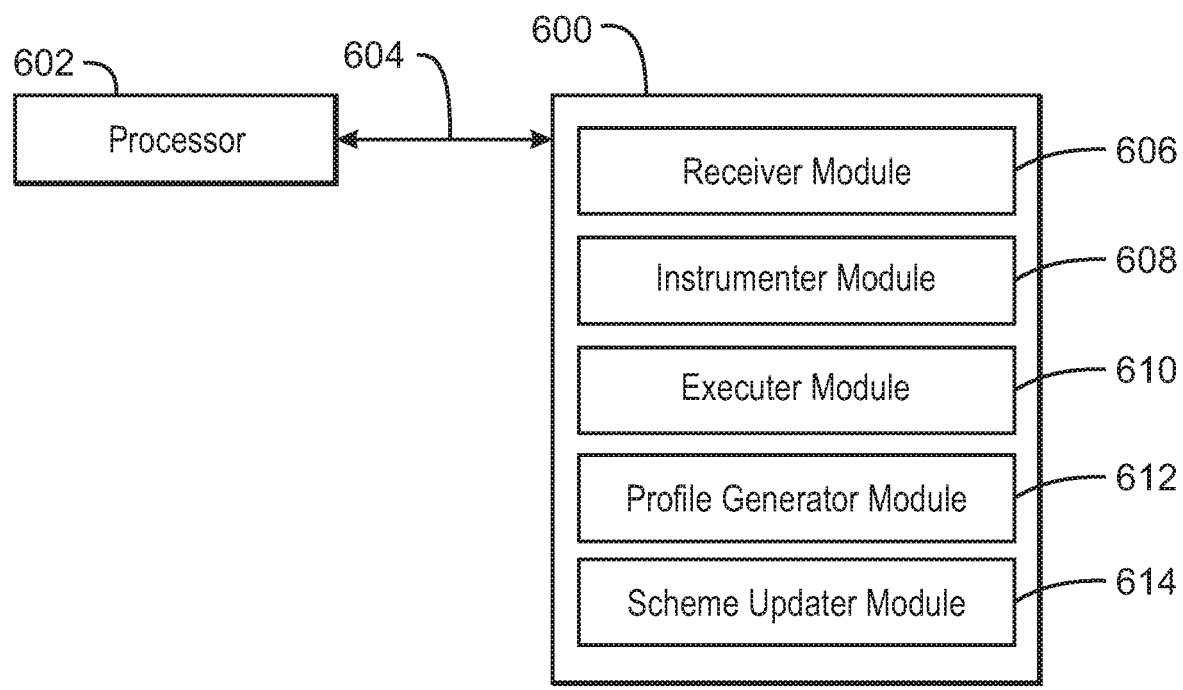
FIG. 6 is an example tangible, non-transitory computer-readable medium that can update taint tags based on runtime behavior profiles.

Referring now to FIG. 6, a block diagram is depicted of an example tangible, non-transitory computer-readable medium 600 that can update taint tags based on runtime behavior profiles. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 200 of FIG. 2 above.

The various software components discussed herein may be stored on the tangible, non-transitory, computer-readable medium 600, as indicated in FIG. 6. For example, a receiver module 606 includes code to receive an application to be instrumented. For example, the application may be a mobile app. An instrumenter module 608 includes code to instrument the application based on a baseline taint tracking scheme to generate an instrumented application including taint tags. For example, the instrumenter module 608 may insert taint tags into the application based on the baseline taint tracking scheme. An executer module 610 includes code to execute the instrumented application. A profile generator module 612 includes code to generate a profile of runtime behavior of the application. For example, the profile generator module 612 can include code to detect a data structure is tainted after a predetermined duration or across a predetermined number of executions of the application. A scheme updater module 614 includes code to modify the baseline tracking scheme based on the profile to generate an updated taint tracking scheme. For example, the scheme updater module 614 can include code to associate a single taint tag with a data structure in response to detecting that components of the data structure tagged according to the baseline tracking scheme are not tainted. In some examples, the scheme updater module 614 can include code to associate per-entry taint tags with entries in a data structure in response to detecting that the data structure tagged with a single taint tag according to the baseline tracking scheme is tainted. In some examples, the scheme updater module 614 can include code to assign a taint tag in response to detecting that a threshold probability of data structures being reached by taint is exceeded. In some examples, the scheme updater module 614 can include code to assign taint tags to entries in a data structure that share a common hash value. In some examples, the instrumenter module 608 can also include code to instrument the application using the updated taint tracking scheme to generate an updated instrumented application. The executer module 610 may also include code to execute the updated instrument application. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, via a processor, an application to be instrumented;
instrumenting, via the processor, the application based on a baseline taint tracking scheme to generate an instrumented application comprising taint tags;
executing, via the processor, the instrumented application to generate a profile of runtime behavior of the application, wherein generating the profile of runtime behavior of the application comprises detecting that a first data structure is not tainted and a second data structure is tainted after a predetermined amount of time or a predetermined number of executions of the application, and generating the profile using a probability distribution, where the first data structure has a probability below a threshold probability not be tagged with a taint tag, and the second data structure has a probability higher than the threshold probability of a taint tag insert during instrumentation;
modifying, via the processor, the baseline taint tracking scheme to add or remove taint tags based on the profile to generate an updated taint tracking scheme, wherein modifying the baseline taint tracking scheme comprises associating a single taint tag with the first data structure of the application in response to detecting that components of the first data structure tagged according to a fine-grained scheme are not tainted, or associating per-entry tags with the entries in the second data structure of the application in response to detecting that the second data structure tagged with a single taint tag according to a coarse-grained tracking scheme is tainted, wherein the updated taint tracking scheme comprises an intermediate granularity of taint tags ranging over entries sharing a common hash value;
instrumenting, via the processor, the application based on the updated taint tracking scheme to generate an updated instrumented application; and
executing the updated instrumented application.

2. The computer-implemented method of claim 1, wherein modifying the baseline taint tracking scheme comprises assigning taint tags based on a threshold probability of data structures being reached by taint being exceeded as determined based on the profile of runtime behavior of the application.

3. The computer-implemented method of claim 1, wherein modifying the baseline taint tracking scheme comprises assigning a taint tag to each entry of a plurality of entries in a data structure that share the common hash value.

4. A system, comprising a processor to:
receive an application to be instrumented;
instrument the application based on a baseline taint tracking scheme to generate an instrumented application comprising taint tags;
execute the instrumented application to generate a profile of runtime behavior of the application, wherein, to generate the profile of runtime behavior of the application, the processor is to detect a first data structure is not tainted and a second data structure is tainted after a predetermined amount of time or a predetermined number of executions of the application, and wherein the processor is to generate the profile using a probability distribution, where the first data structure has a probability below a threshold probability not be tagged with a taint tag, and the second data structure has a probability higher than the threshold probability of a taint tag insert during instrumentation;
modify the baseline taint tracking scheme to add or remove taint tags based on the profile to generate an updated taint tracking scheme, wherein, to modify the baseline taint tracking scheme, the processor is to associate a single taint tag with the first data structure of the application in response to detecting that components of the first data structure tagged according to a fine-grained scheme are not tainted, or associate per-entry tags with the entries in the second data structure of the application in response to detecting that the second data structure tagged with a single taint tag according to a coarse-grained tracking scheme is tainted;
instrument the application using the updated taint tracking scheme to generate an updated instrumented application, wherein the updated taint tracking scheme comprises an intermediate granularity of taint tags ranging over entries sharing a common hash value; and
execute the updated instrument application.

5. The system of claim 4, wherein the baseline taint tracking scheme comprises a preconfigured default taint tag granularity.

6. The system of claim 4, wherein the instrumented application comprises a plurality of taint tags to track taint propagation.

7. A computer program product for updating taint tags based on runtime behavior profiles, the computer program product comprising a computer-readable storage medium having program code embodied therewith, wherein the computer-readable storage medium is not a transitory signal per se, the program code executable by a processor to cause the processor to:
receive an application to be instrumented;
instrument the application based on a baseline taint tracking scheme to generate an instrumented application comprising taint tags;
execute the instrumented application to generate a profile of runtime behavior of the application, wherein, to generate the profile of runtime behavior of the application, the processor is to detect a first data structure is not tainted and a second data structure is tainted after a predetermined amount of time or a predetermined number of executions of the application, and wherein the processor is to generate the profile using a probability distribution, where the first data structure has a probability below a threshold probability not be tagged with a taint tag, and the second data structure has a probability higher than the threshold probability of a taint tag insert during instrumentation;
modify the baseline taint tracking scheme to add or remove taint tags based on the profile to generate an updated taint tracking scheme, wherein, to modify the baseline taint tracking scheme, the processor is to associate a single taint tag with the first data structure of the application in response to detecting that components of the first data structure tagged according to a fine-grained scheme are not tainted, or associate per-entry tags with the entries in the second data structure of the application in response to detecting that the second data structure tagged with a single taint tag according to a coarse-grained tracking scheme is tainted;

instrument the application using the updated taint tracking scheme to generate an updated instrumented application, wherein the updated taint tracking scheme comprises an intermediate granularity of taint tags ranging over entries sharing a common hash value; and execute the updated instrument application.

8. The computer program product of claim 7, comprising program code executable by the processor to assign a taint tag in response to detecting that a threshold probability of data structures being reached by taint is exceeded.

9. The computer program product of claim 7, comprising program code executable by the processor to assign taint tags to entries in a data structure that share the common hash value.

* * * * *